(12) United States Patent
Illingworth

(10) Patent No.: US 6,742,626 B2
(45) Date of Patent: Jun. 1, 2004

(54) ELASTIC MOTOR HAVING TIME-AVERAGED CONSTANT TORQUE OUTPUT

(75) Inventor: Lewis Illingworth, Kensington, NH (US)

(73) Assignee: Avionic Instruments, Inc., Avenel, NJ (US)

( * ) Notice: Subject to any disclaimer, the term of this patent is extended or adjusted under 35 U.S.C. 154(b) by 0 days.

(21) Appl. No.: 10/208,255

(22) Filed: Jul. 30, 2002

(65) Prior Publication Data

US 2003/0024769 A1 Feb. 6, 2003

Related U.S. Application Data

(62) Division of application No. 09/578,419, filed on May 25, 2000, now Pat. No. 6,612,402.

(51) Int. Cl.[7] .................................................. F03G 1/00
(52) U.S. Cl. ........................ 185/40 R; 185/9; 185/37; 242/373
(58) Field of Search .................................. 185/9, 10, 11, 185/37, 40 H, 39, 45, DIG. 1, 40 R; 242/373

(56) References Cited

U.S. PATENT DOCUMENTS

| | | | | | |
|---|---|---|---|---|---|
| 3,638,682 | A | * | 2/1972 | Heyer et al. | 137/624.12 |
| 4,240,525 | A | * | 12/1980 | Kubiatowicz | 185/38 |
| 4,318,455 | A | * | 3/1982 | Lapierre | 185/39 |
| 4,478,313 | A | * | 10/1984 | Wakase | 185/39 |
| 4,629,438 | A | * | 12/1986 | McAneny | 446/58 |
| 4,762,202 | A | * | 8/1988 | Ogawa et al. | 185/39 |
| 5,390,763 | A | * | 2/1995 | Liedtke | 185/39 |
| 6,196,894 | B1 | * | 3/2001 | Kennedy et al. | 446/461 |
| 6,199,664 | B1 | * | 3/2001 | Tkaczyk et al. | 185/39 |

* cited by examiner

Primary Examiner—David Fenstermacher
(74) Attorney, Agent, or Firm—Ward & Olivo

(57) ABSTRACT

An elastic motor having a constant torque characteristic utilizes a reel with elastic divided into unit lengths that are stretched to their maximum tension. Each unit length of the elastic is allowed to relax to its normal state while generating work in a process that will continue until the wheel is fully unwound. The present invention will ease design of mobile devices and the like by providing a power source having a predictable, constant, and stable output characteristic.

17 Claims, 10 Drawing Sheets

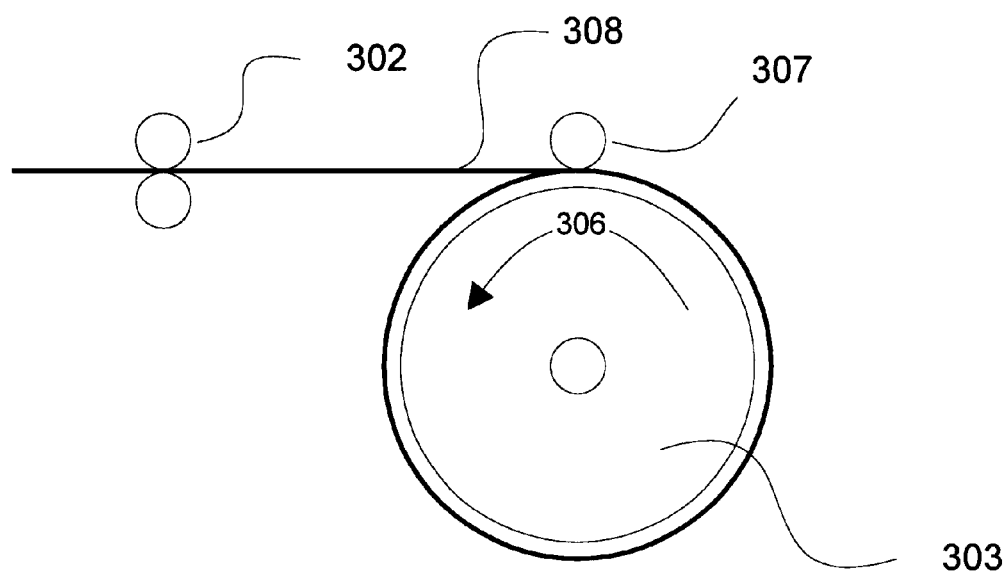
FIG. 3C
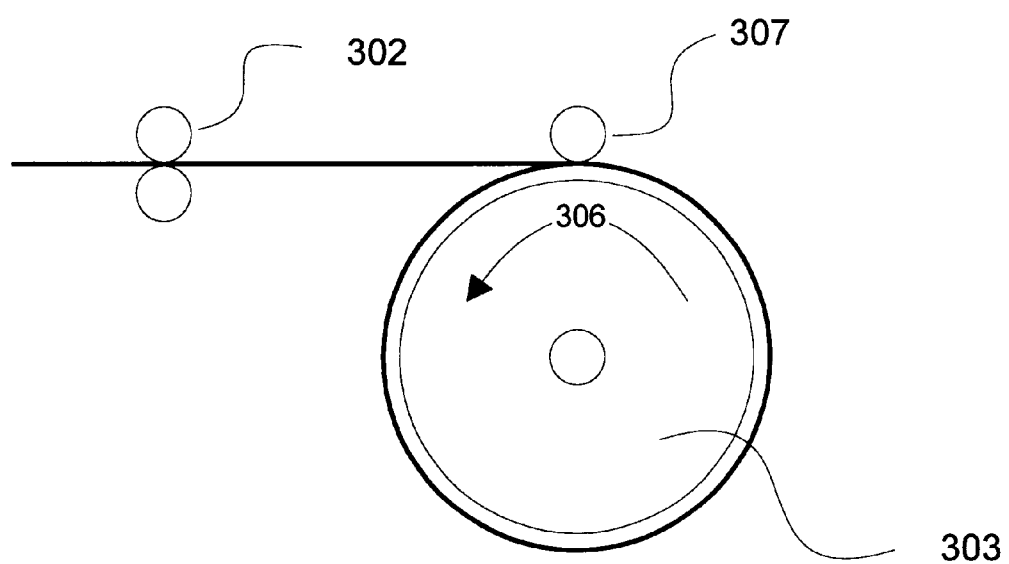
FIG. 3D (1)

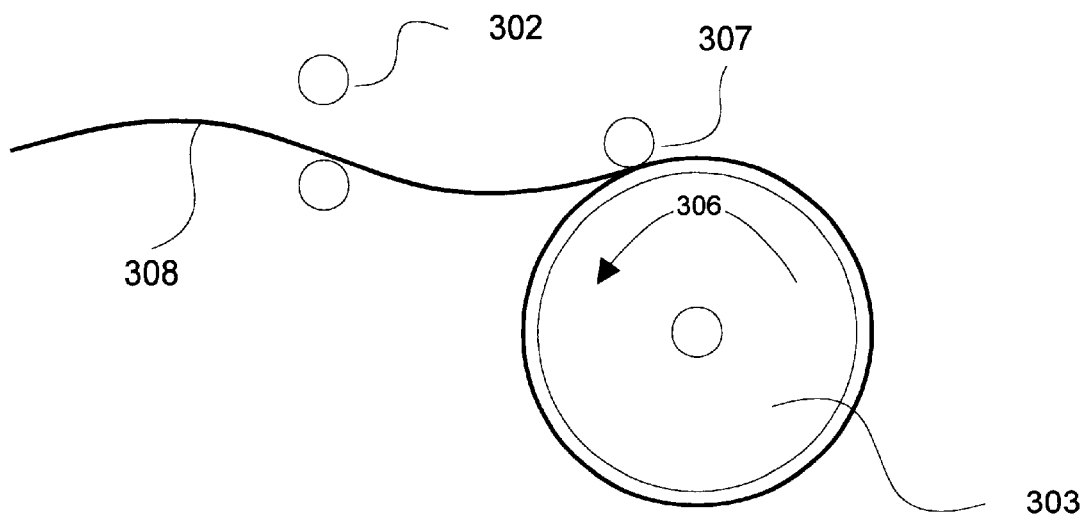
FIG. 3D (2)
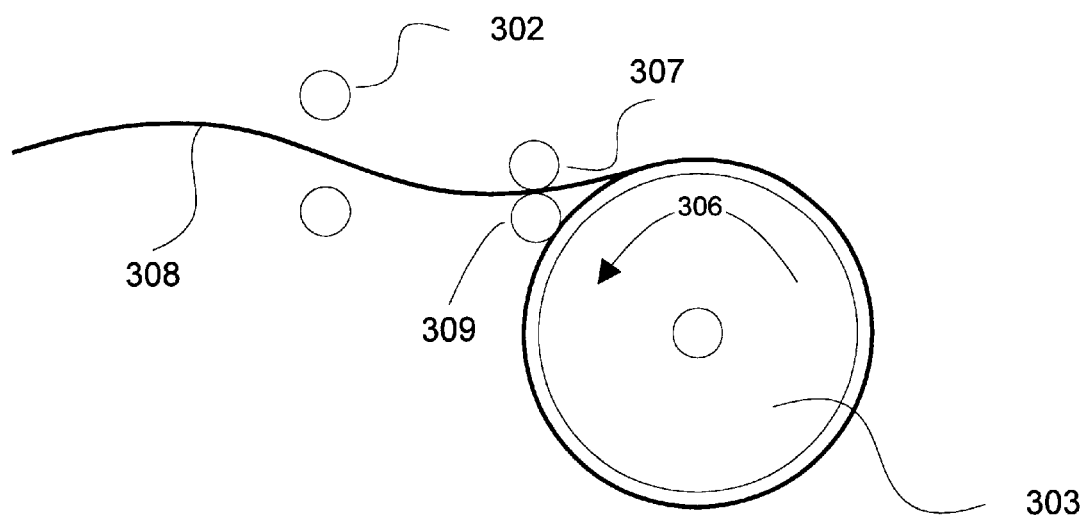
FIG. 3D (3)

FIG. 3D (4)

SPEED V/n

SPEED V

ELASTIC MOTOR HAVING TIME-AVERAGED CONSTANT TORQUE OUTPUT

RELATEDNESS TO OTHER APPLICATIONS

This application is a divisional of application Ser. No. 09/578,419, filed May 25, 2000, now U.S. Pat. No. 6,612,402 entitled "Elastic Motor," which is hereby incorporated herein by reference.

SCOPE OF THE INVENTION

This invention relates generally to elastic motors. More specifically, this invention relates to an improved elastic motor having a torque output that is substantially constant when averaged over time.

BACKGROUND OF THE INVENTION

Elastic motors have been employed for centuries and have found particular application in model airplanes for over 150 years.

Typical prior art elastic motors, such as those used in a model airplane, generally comprise a rubber loop threaded through a hook on a propeller shaft and is further attached to another hook at the tail of the craft. As the motor is wound up it first twists the elastic into a skein, then a row of knots form and spread along the whole length. A third stage occurs when a row of knots forms in the already knotted skein. When this row is complete the rubber is substantially stretched to its limit.

Upon release of propeller, there is a burst of power. When this is spent, a period of slowly declining torque follows for the majority of the motor run and is followed by a decline to zero torque.

The torque characteristics of the prior art elastic motor devices, like those described above, make model airplane design a considerable challenge. Clearly, this is because it is difficult for a designer to properly construct design constraints when the source of propulsion has such wavering torque characteristics. Aside from model airplane design, conventional elastic motors have undesirable performance in other applications as well. The knotting of the rubber introduces internal friction in the wound skein that can be eased somewhat by lubrication. Lubrication, however, drastically reduces the useful life of the rubber.

Therefore, the shortcomings of the prior art suggest a strong need for an elastic motor design that has a constant torque characteristic and does not damage the elastic material.

SUMMARY OF THE INVENTION

The present invention is directed towards an elastic motor, more specifically, to an elastic motor having a time-averaged constant torque characteristic.

The motor system of an embodiment of the present invention starts with a reel which is wound with elastic stretched to its maximum tension. Each unit length of the elastic is allowed to relax back to its normal state while generating torque in a process that continues until the reel is fully unwound. The process may be seen as analogous to a steam engine which has a supply of steam at constant pressure. Portions of steam are fed to a cylinder where they expand to generate work (pressure times change in volume) by pushing a cylinder back to turn a wheel. When the expansion is complete the steam is exhausted and the process repeated. In the case of the present invention, a unit length of stretched elastic is connected into a system and allowed to contract to its unstressed state while turning a wheel and developing work. When fully contracted the relaxed elastic is fed to a take up reel and a new unit length of stretched elastic is taken. The process is continued until all the stretched elastic is used up. There is no twisting or knotting of the elastic and no need to lubricate it to prevent binding and wear as in a twisted skein, although some lubrication may assist operation. Thus, the present invention can be further analogized to a two-cycle gasoline engine whose pulses of torque are smoothed by a flywheel to create a constant output.

Hence, it is an object of the invention to provide an improved elastic motor.

Furthermore, it is an object of the invention to provide an improved elastic motor having a constant torque characteristic.

Further, it is an object of the invention to provide an improved means of powering portable devices.

Additionally, it is an object of the invention to provide an elastic motor having increased elastic material life.

Further, it is an object of the invention to provide an improved means of driving a dynamo.

Furthermore, it is an object of the invention to provide an improved means of powering wind-up toys and devices.

These and other objects will become apparent to those skilled in the art upon study of the following drawings and detailed description.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 3C (FIG. 3C) depicts an elastic motor, in accordance with the present invention, at the end of the first cycle of operation.

FIG. 3D (FIG. 3D) depicts the behavior of the elastic material in an elastic motor in accordance with the present invention.

DETAILED DESCRIPTION OF THE INVENTION

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention and features thereof.

Figure 1:
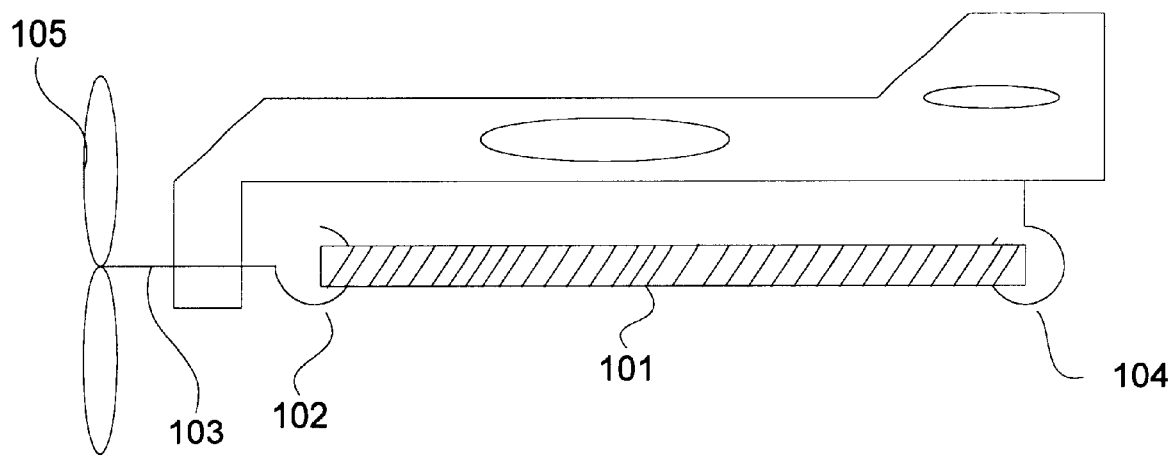
FIG. 1 (FIG. 1) depicts an elastic motor typical of the prior art.

FIG. 1 depicts a typical prior art elastic motor in a model airplane. A rubber loop 101 is threaded through a hook 102 on the propeller shaft 103 and is attached to another hook 104 at the tail. As the motor is wound up it first twists into a skein, then a row of knots form and spread along the whole length. A third stage occurs when a row of knots forms in the already knotted skein. When this row is complete the rubber is generally stretched to its limit.

Figure 2:
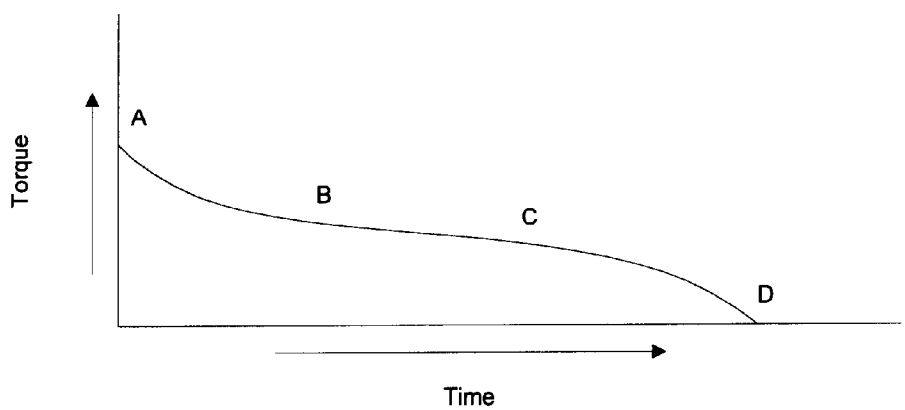
FIG. 2 (FIG. 2) depicts the torque characteristics of an elastic motor typical of the prior art.

Upon release of propeller 105 there is a burst of power, A to B as depicted on the torque characteristic of FIG. 2. When this is spent, a period of slowly declining torque B to C follows for the majority of the motor run and is followed by a decline to zero torque, points C to D.

Figure 3A:
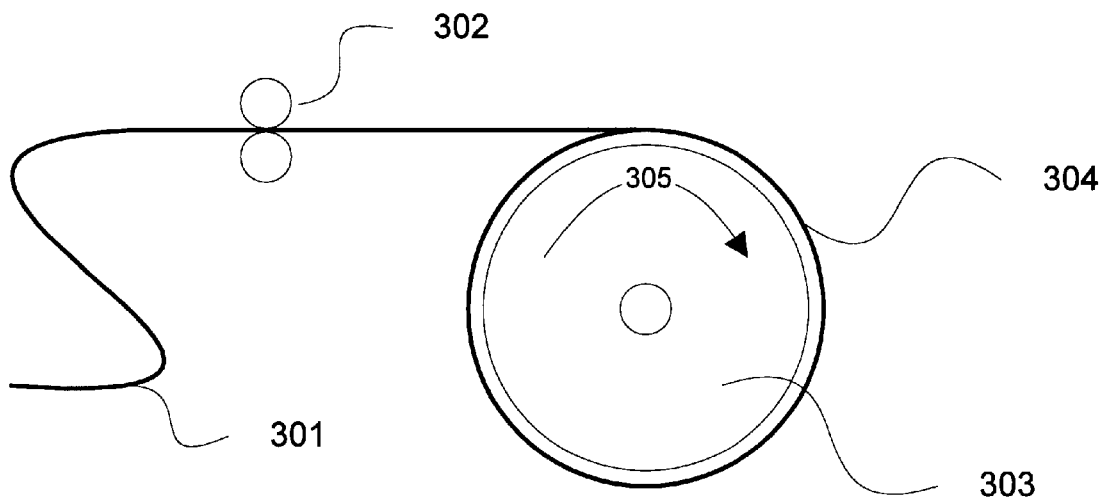
FIG. 3A (FIG. 3A) depicts an elastic motor, in accordance with the present invention, in wind up mode.

FIGS. 3A through 3D show a first embodiment of the present invention. FIG. 3A shows an elastic motor in accordance with the present invention in wind up mode. Fully relaxed elastic 301 passes through movable rollers 302 as reel 303 rotates in a clockwise direction 305. The elastic 304 is wound at constant tension and is fully stretched.

Figure 3B:
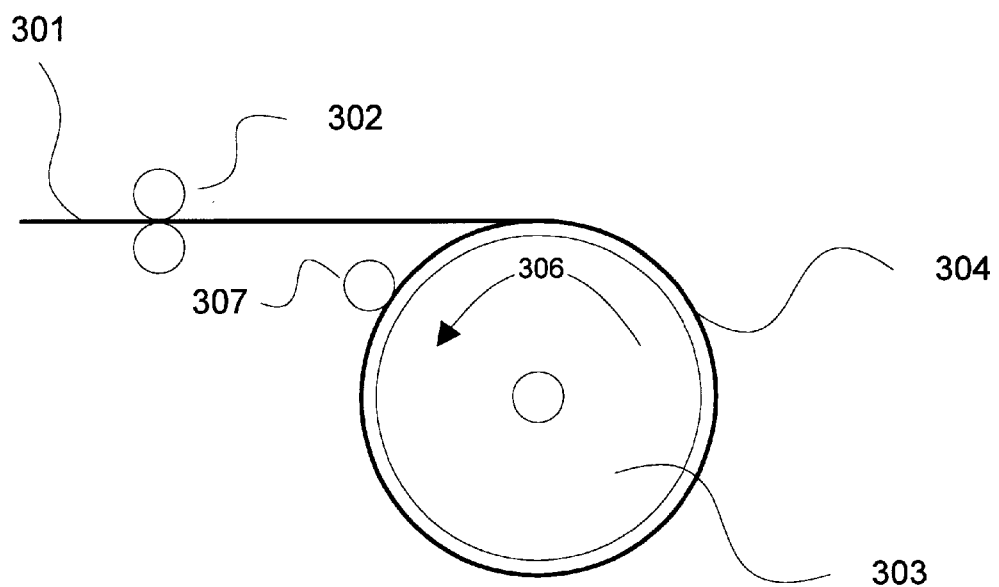
FIG. 3B (FIG. 3B) depicts an elastic motor, in accordance with the present invention, in the start of operating mode.

In FIG. 3B, an elastic motor in accordance with the present invention at the start of operating mode is depicted. Movable rollers 302 grab the elastic 301 close to the reel 303. Bar 307 is coupled to the reel 303 and is used to prevent slip of the stretched elastic 304. The length of the elastic between 307 and 302 is NL where L is a unit length of relaxed elastic. The operation cycle allows this to be relaxed back to its relaxed length L while the tension in the elastic provides torque to turn reel 303 and supply power to a load. Reel 303, upon release, will begin to rotate in a counter-clockwise direction 306.

FIG. 3C depicts an elastic motor in accordance with the present invention at the end of the first operating cycle. Reel 303 is allowed to release, causing counterclockwise rotation 306. The length between rollers 302 and bar 307 shortens to unit length L as the tension in the elastic 308 decreases until complete relaxation.

FIG. 3D depicts an elastic motor in accordance with the present invention that is capable of multiple operating cycles. This is accomplished by introducing an additional bar 309 and disengaging bar 307. In FIG. 3D(1), the elastic motor is shown at the end of the first operating cycle, as described above in FIG. 3C. In FIG. 3D(2), rollers 302 are first backed up and the elastic 308 is released. Bar 307 remains engaged to maintain secure contact between elastic 308 and reel 303. Reel 303 continues to rotate in counter-clockwise direction 306. In FIG. 3D(3) the changeover point between cycles is shown. While the elastic remains released between reels 302, additional bar 309 is introduced between bar 307 and elastic 308. Reel 303 is poised to continue rotation in counterclockwise direction 306. In FIG. 3D(4) the start of the second cycle is shown. Pinch rollers 307 and 309 are moved to position 302 and new clamping bar 315 is placed in the initial position of 307 as in FIG. 3B. Clamping rollers 307 and 309 are opened and elastic 308 is released. This cycle is identical to the start of the first operating cycle described in FIG. 3B, with bar 307 replaced with bar 315. Reel 303 is now ready to continue rotating in counterclockwise direction 306 until bar 315 approaches clamping rollers 307 and 309 in position 302. At that point, the cycle repeats with bar 315 in position of 307 of FIG. 3D(1). The pinch rollers 302 and clamping bars 307, 315 and 309 recycle their functions with each ensuing cycle.

Figure 3E:
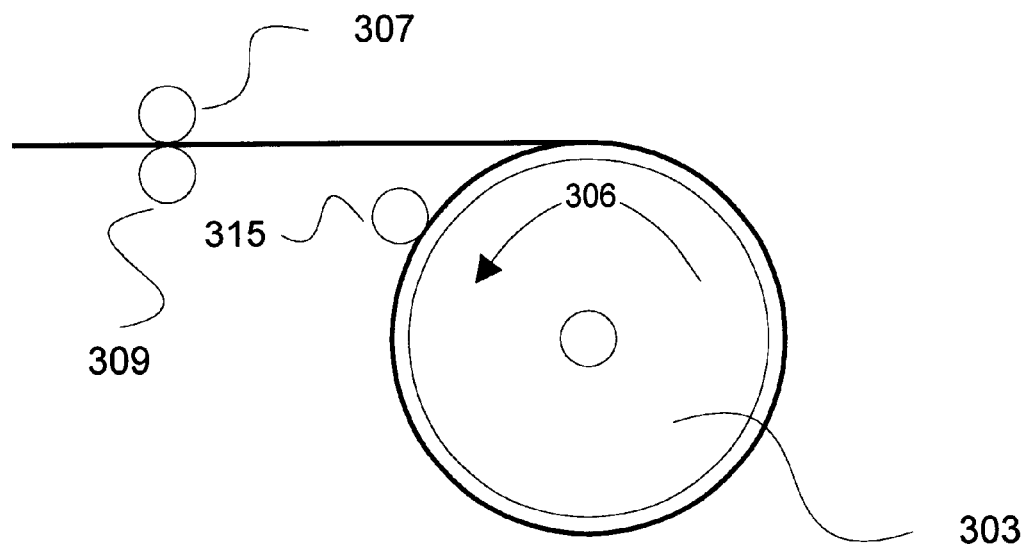
FIG. 3E (FIG. 3E) depicts the torque characteristics of an elastic motor in accordance with the present invention.
Figure 3E:
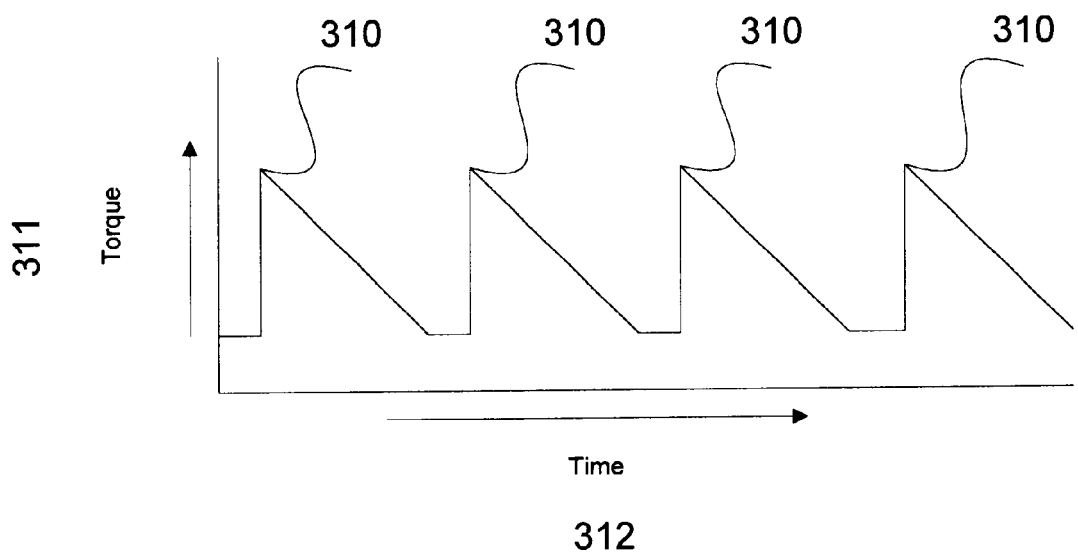

FIG. 3E depicts the output torque characteristics of an elastic motor in accordance with the present invention. Torque is plotted on axis 311 versus time on axis 312. Peak values 310 are equal to the elastic tension multiplied by the reel radius. The average output torque is half that amount and is constant throughout operation. The constant output is achieved by averaging the motor's sawtooth output pattern, which is repeated multiple times prior to the elastic's exhaustion.

Figure 4A:
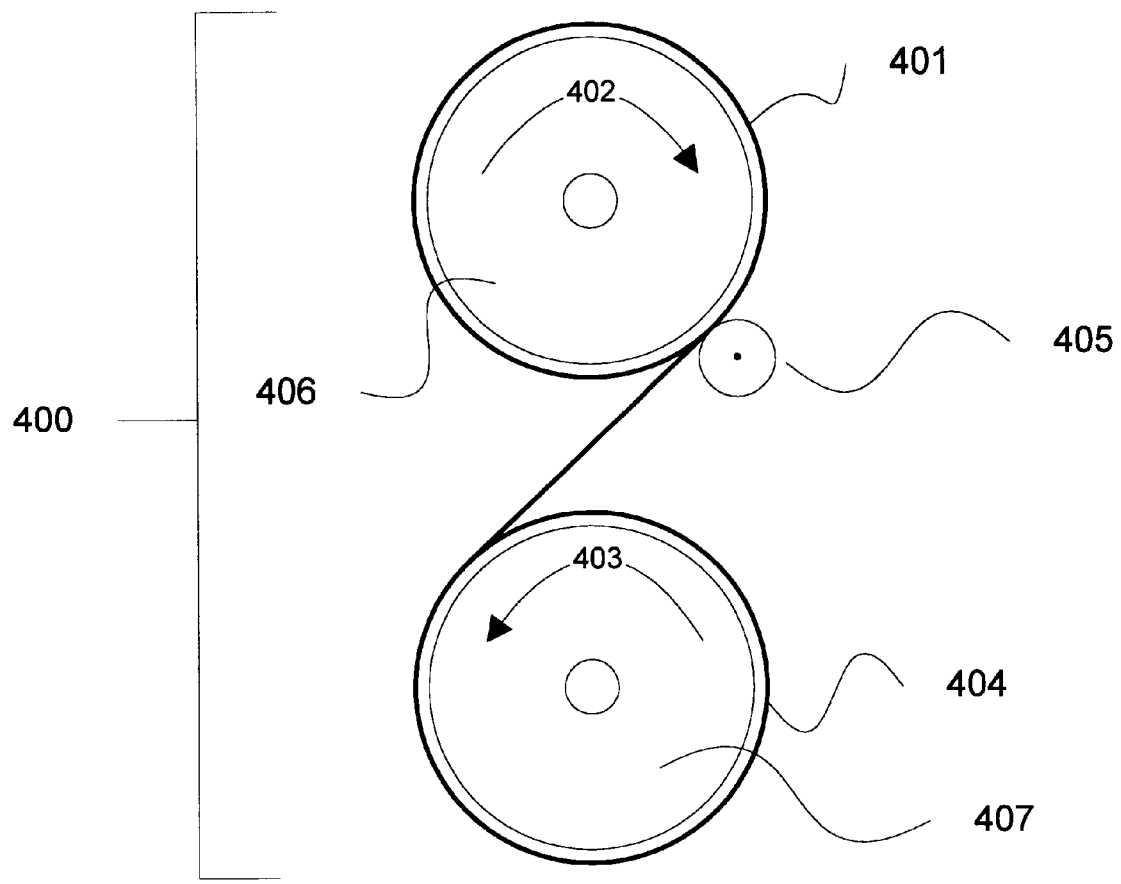
FIG. 4A (FIG. 4A) depicts an alternate embodiment of an elastic motor in accordance with the present invention.

Another embodiment of the present invention comprises two reels, one for relaxed elastic, the other for stretched elastic. The two reels may be the same size, but it is not necessary. Differing diameters or geometries can provide different output characteristics. FIG. 4A depicts an exemplary motor 400 in accordance with this embodiment of the present invention. Motor 400 is shown in wind up mode. Reel 406 is loaded with relaxed rubber 401, the end of which is connected to opposing reel 407. Reel 406 rotates in a clockwise direction 402 and reel 407 rotates in counter-clockwise direction 403. The elastic 404 wound on reel 407 is stretched to n times its lengthened, and optimally, is at full tension. Thus reel 407 turns n times as fast as reel 406. Roller 405 prevents the elastic 401 on reel 406 from slipping over itself and ruining the tension relationship.

Figure 4B:
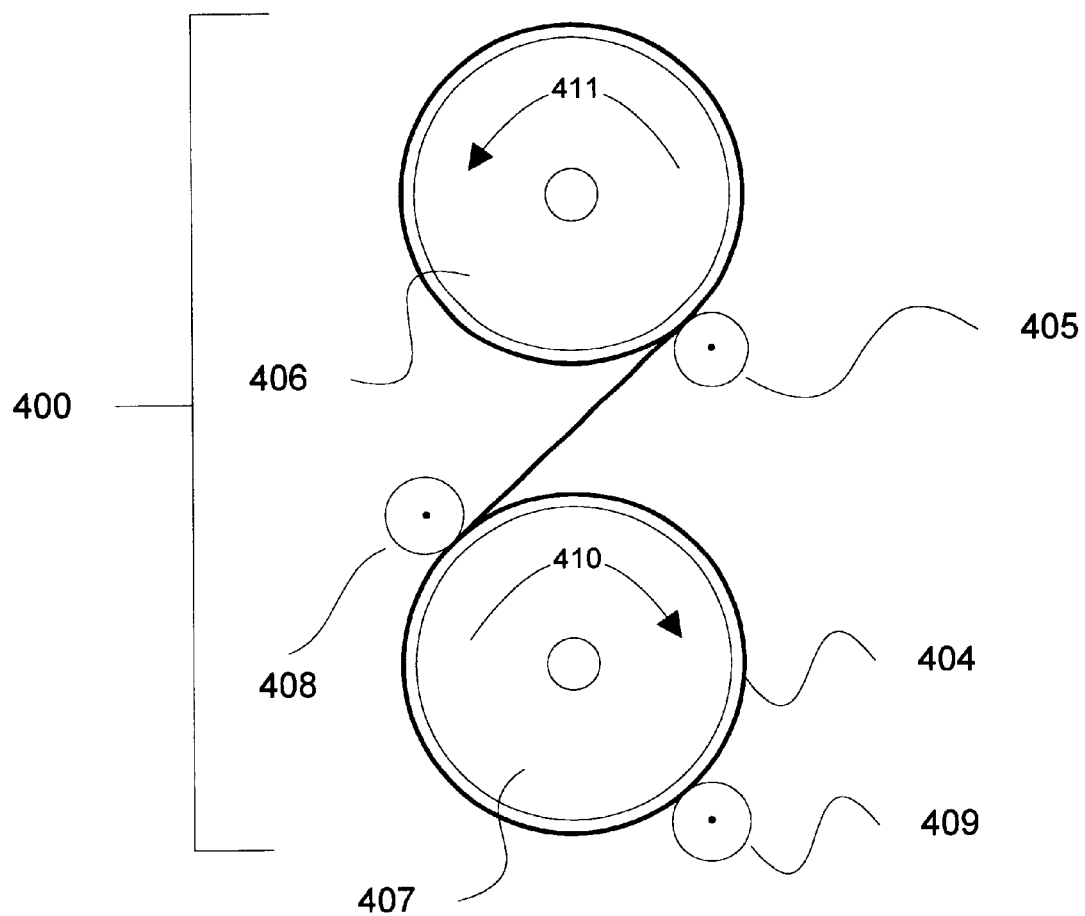
FIG. 4B (FIG. 4B) depicts an alternate embodiment of an elastic motor in accordance with the present invention, in operational mode.

FIG. 4B depicts the motor 400 in operational mode, wherein the device is producing work. Reel 407 has two bars 408 and 409 pressing against the elastic 404 to prevent slippage. Reel 407 rotates in clockwise direction 410 taking bars 408 and 409 with it. Opposing reel 406 rotates in counterclockwise direction 411. When bar 408 approaches roller 405, the elastic 404 between bar 408 and roller 405 is in its relaxed state. At this point, roller 405 is disengaged to allow bar 408 to pass and further allow elastic 404 to wind onto reel 406. After bar 408 passes, roller 405 is put back in place. Bar 408 is now removed and the elastic 404 between bar 407 and roller 405 undergoes the same process. At this point, bar 408 is replaced and is ready for the next cycle. Motor 400 is capable of multiple operating cycles.

Figure 5A:
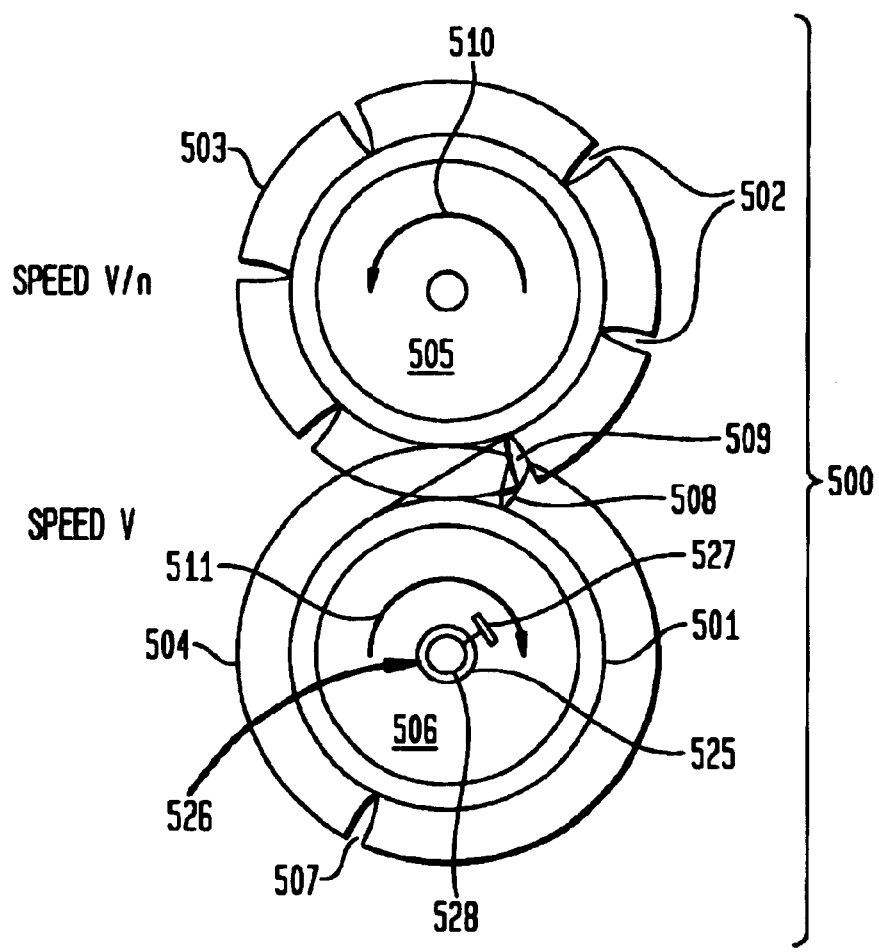
FIG. 5A (FIG. 5A) depicts an alternate embodiment of an elastic motor in accordance with the present invention utilizing crossbars in the elastic.

Such a device 400 as described can achieve the required operation, however, the need to remove and replace bars 408 and 409 and roller 405 complicates operation. Thus, an alternate embodiment is depicted in FIG. 5A. An elastic sheet 501 is used comprising integral crossbars that engage in slots 502, 507 and 508 on reel end plates 503 and 504 to maintain the high and low tension zones in the elastic 501 and allow automatic transfer between the two reels 505 and 506 without the need for any other moving parts. In other words, slots 502, 507 and 508 and bars 516 on the elastic sheet ensure that only unit lengths of the elastic are stretched and released. This preserves the sawtooth output pattern of FIG. 3E, and thus results in a constant torque output when averaged. Averaging can be achieved simply by the mass of the reels. A locking mechanism 525 on reel 506 prevents rotation until the lock is released. The locking mechanism 525 shown in this embodiment comprises a collar 526 coupled to said reel 506 and surrounding axle 528. When screw member 527 is rotated such that it traverses through said collar 526 toward said axle 528, it eventually contacts axle 528. Thus, reel 506 cannot rotate. Upon rotating screw member 527 such that it traverses away from said axle allows reel 506 to rotate, thereby releasing the energy in said elastic member 501. Of course, this is merely exemplary of possible locking mechanisms, and many other types, e.g., ratchets, are contemplated. The two reels 505 and 506 are fitted with slotted end plates 503 and 504. Reel 505 rotates in counterclockwise direction 510 $1/n$ times as fast as reel 506 rotates in clockwise direction 511. Reel 506 has two slots 507 and 508 in its end plates. Reel 505 has 2n slots 502 in its end plates 503. The end plates 503 and 504 overlap at point 509 so that the elastic 501 can transfer between the reels 505 and 506 without any slipping and thus maintain the tension relationship. Rotating reel 506 counterclockwise will automatically stretch the elastic 501 to n times its original length. The two reels 505 and 506 could be coupled together by a gear box or a cog belt to have an n to 1 speed ratio and assist in maintaining accurate alignment. Coupling the two reels 505 and 506 together reduces the output torque to $[1-(1/n)]$ of the maximum. Thus, the higher the value of n, the higher the system efficiency.

Figure 5B:
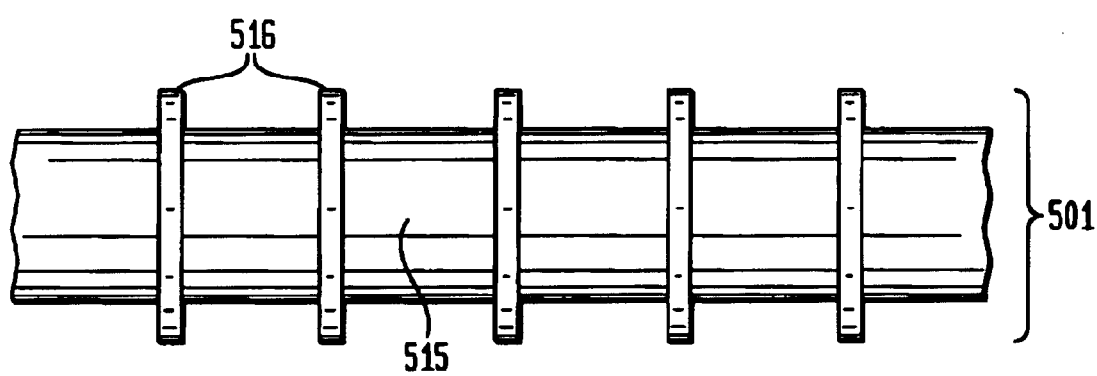
FIG. 5B (FIG. 5B) depicts a detail of the elastic used in the device of FIG. 5A.

FIG. 5B depicts a detail of the elastic used in device 500. Elastic 501 comprises an elastic strip 515 and integral crossbars 516. Crossbars 516 articulate with slots 502, 507 and 508 to constrain the movement of reels 505 and 506 and thus maintain the tension relationship.

Figure 6:
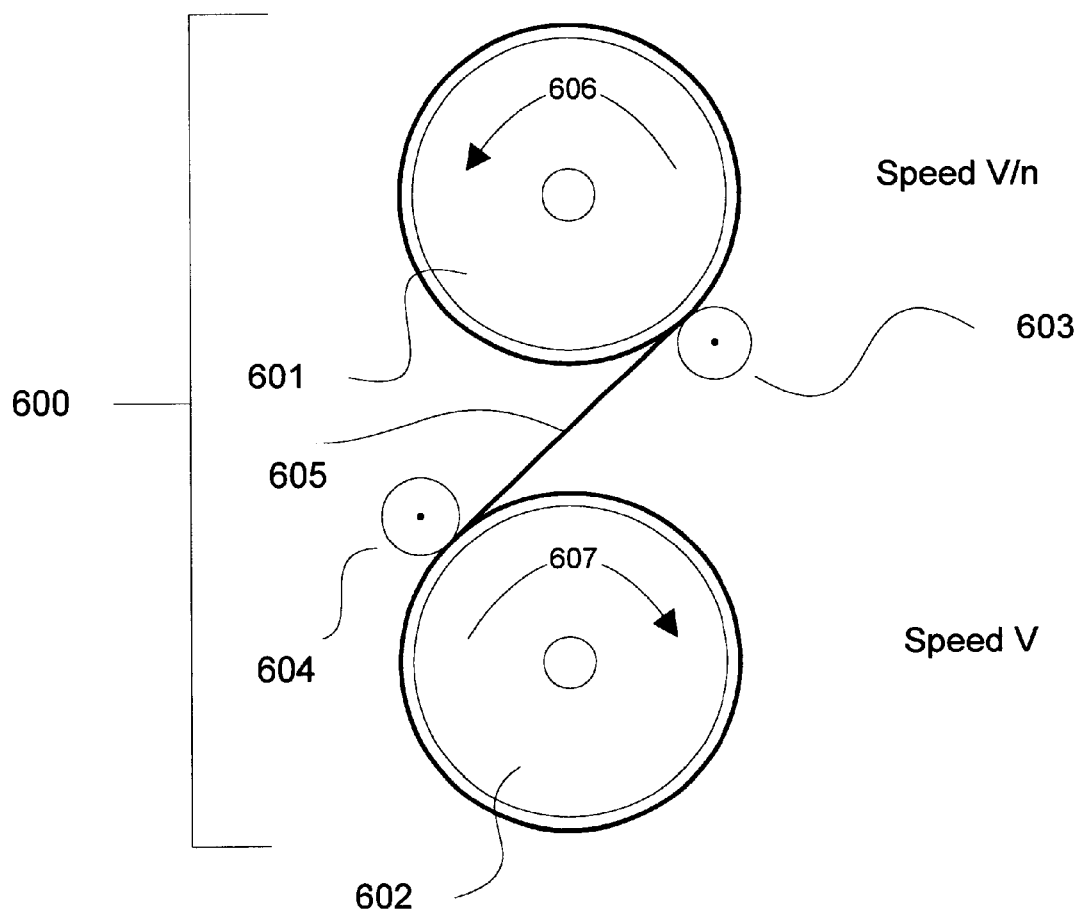
FIG. 6 (FIG. 6) depicts a simplified two reel arrangement utilizing two rollers.

FIG. 6 depicts a simplified two reel system 600 utilizing two rollers 603 and 604. Relaxed tension reel 601 rotates in counterclockwise direction 606 at 1/n times the speed the stretched elastic reel 602 rotates in clockwise direction 607. Two rollers 603 and 604 prevent the elastic 605 from slipping on reels 601 and 602. The system 600 winds up on reel 602 and the elastic 605 is stretched n times its released length. However, one who is skilled in the art would recognize the need to maintain high tension between rollers 604 and 603 to maintain motive force.

Figure 7:
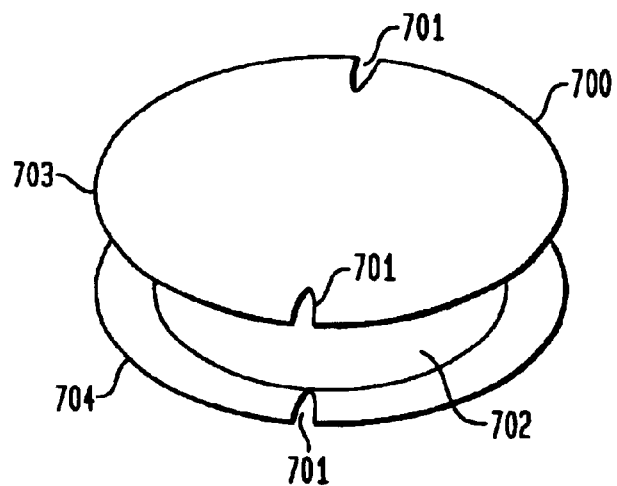
FIG. 7 (FIG. 7) depicts an embodiment of a cylindrical reel for use with the present invention.

FIG. 7 shows an exemplary reel 700 having a cylindrical shape. Reel 700 is designed for use with the embodiments described in FIGS. 5A and 5B. Reel 700 comprises endplates 704 and 703. Though two endplates are preferred, a reel could be used that has only one endplate. Each endplate 703 and 704 comprises slots 701 into which the transverse members of the elastic member heretofore described can articulate.

Figure 8:
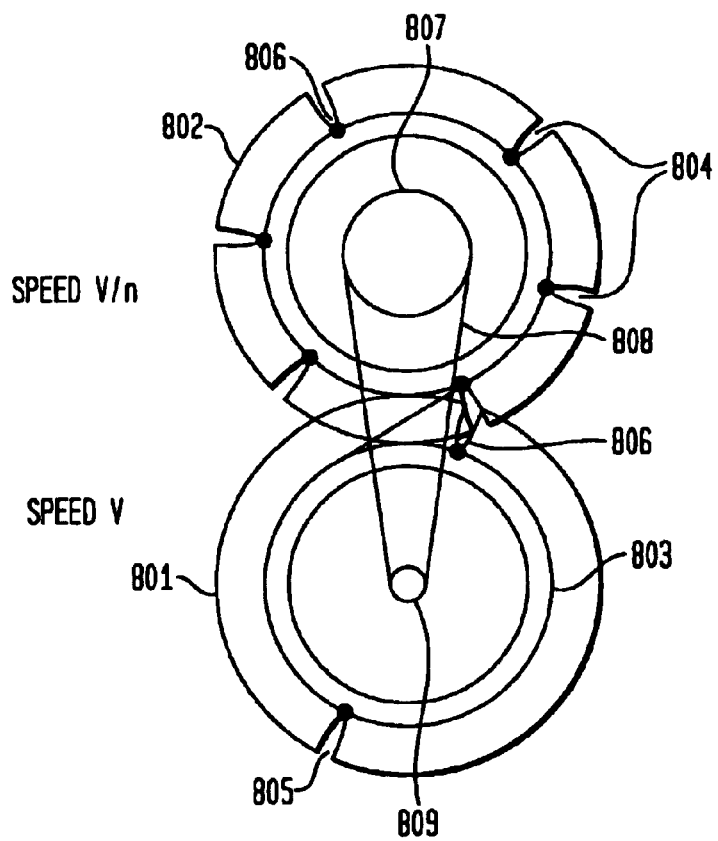
FIG. 8 (FIG. 8) depicts a possible cogwheel and cogbelt arrangement usable with the present invention for maintaining optimum relative speed between the two reels.

FIG. 8 depicts an exemplary cogwheel and cogbelt arrangement for maintaining the optimum relative speed between first reel 801 and second reel 802. As before, elastic member 803 is wound from second reel 802 onto first reel 801 under tension. Crossmembers 806, which articulate into slots 804 and 805, ensure the proper tension relationship. The ratio of slots in the endplate on the first reel 801 compared to the number of slots in the endplate on the second reel 802 define the speed and tension relationship between the two reels. In the figure, an exemplary ratio of 2:6 (or 1:3) is shown. This causes elastic member 803 to be stretched to 3 times its length when wound upon the first reel 801. To help maintain proper alignment and tension, a cogwheel and cogbelt arrangement can be used. A first cogwheel 809 is coupled to the first reel 801 and a second cogwheel 807 is coupled to the second reel 802. The first and second cogwheels are coupled by a cogbelt 808. Notably, the size ratio of the cogwheels 809 and 807 is dictated by the slot ratio. In this case, to ensure that the first reel 801 rotates three times as fast as the second reel 802, the first reel uses a cogwheel one third of the diameter of cogwheel 807.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

I claim:

1. A method of producing a substantially sawtoothed constant torque output comprising the steps of:

dividing an elastic member into a plurality of elastically independent sections;

individually putting at least some of said sections of said elastic member under tension, such that at least some of said elastic member is under substantially uniform tension; and individually releasing the tension in each of said sections.

2. A mechanical stored energy device comprising:

a first reel, said first reel being rotatable, and further comprising a lock to prevent rotation of said first reel;

a first endplate, coupled to said first reel, having a diameter substantially larger than said first reel and further having a common axis of rotation with said first reel, said first endplate further comprising a plurality of slots;

a member, said member being both flexible and stretchable, said member further comprising transverse bars, said bars dividing said member into elastically independent sections, said member further capable of winding upon said first reel under tension, wherein said tension stretches said member;

a second reel, said second reel being rotatable, said second reel coupled to said first reel via said member;

a second endplate, coupled to said second reel, and further overlapping said first endplate, having a diameter substantially larger than said second reel and further having a common axis of rotation with said second reel, said second endplate further comprising a plurality of slots;

wherein said transverse bars of said member articulate with said slots of said first endplate and said second endplate, thus, when said lock is released the energy stored in said member under tension is released, allowing the transfer of energy between said first reel and said second reel, causing rotation of said second reel, said rotation having a substantially sawtoothed constant torque characteristic.

3. A mechanical stored energy device in accordance with claim 2, wherein said member is comprised of elastomeric material.

4. A mechanical stored energy device in accordance with claim 2, wherein said first reel is cylindrically shaped.

5. A mechanical stored energy device in accordance with claim 2, wherein said second reel is cylindrically shaped.

6. A mechanical stored energy device having a substantially constant torque output, said mechanical stored energy device comprising:
- an elastic member consisting of an elastic material, and further comprising transverse members, said transverse members being substantially stiffer than said elastic material;
- a first reel, said first reel being rotatable, and further comprising a first endplate, said first endplate comprising a plurality of slots into which said transverse members can articulate, wherein said elastic member is coupled to said first reel;
- a second reel, said second reel being rotatable, and further comprising a second endplate, said second endplate comprises fewer slots than said first endplate, wherein said transverse members articulate into said slots on said second endplate, thereby winding said elastic member under substantially uniform tension.

7. A mechanical stored energy device according to claim 6 wherein said elastic material is an elastomeric material.

8. A mechanical stored energy device according to claim 6 wherein said elastic material is rubber.

9. A mechanical stored energy device according to claim 6 wherein said transverse members are perpendicular to said elastic member.

10. A mechanical stored energy device according to claim 6 wherein said transverse members are made of metal.

11. A mechanical stored energy device according to claim 6 wherein said elastic member is substantially greater in length than in width.

12. A mechanical stored energy device according to claim 6 wherein said first reel is cylindrical.

13. A mechanical stored energy device according to claim 6 wherein said first endplate shares a common axis of rotation with said first reel.

14. A mechanical stored energy device according to claim 6 wherein said first endplate is circular.

15. A mechanical stored energy device according to claim 6 wherein said second reel is cylindrical.

16. A mechanical stored energy device according to claim 6 wherein said second endplate shares a common axis of rotation with said second reel.

17. A mechanical stored energy device according to claim 6 wherein said second endplate is circular.

* * * * *